United States Patent
Tripp et al.

(10) Patent No.: US 9,436,829 B2
(45) Date of Patent: Sep. 6, 2016

(54) SECURITY TESTING OF WEB APPLICATIONS WITH SPECIALIZED PAYLOADS

(71) Applicant: GLOBALFOUNDRIES INC., Grand Cayman (KY)

(72) Inventors: Omer Tripp, Bronx, NY (US); Emmanuel Wurth, Saubens (FR)

(73) Assignee: GLOBALFOUNDRIES INC., Grand Cayman (KY)

( * ) Notice: Subject to any disclaimer, the term of this patent is extended or adjusted under 35 U.S.C. 154(b) by 42 days.

(21) Appl. No.: 14/490,788

(22) Filed: Sep. 19, 2014

(65) Prior Publication Data

US 2015/0106943 A1    Apr. 16, 2015

(30) Foreign Application Priority Data

Oct. 14, 2013 (GB) .................................... 1318119.3

(51) Int. Cl.
  *G06F 21/57* (2013.01)
  *H04L 29/06* (2006.01)
(52) U.S. Cl.
  CPC .......... *G06F 21/577* (2013.01); *H04L 63/1433* (2013.01); *H04L 63/1483* (2013.01); *G06F 2221/033* (2013.01)
(58) Field of Classification Search
  CPC ............ H04L 63/1441; H04L 63/1483; H04L 63/1416; H04L 63/0245; H04L 63/1433; H04L 27/2681; H04L 1/008; H04L 5/0044; G06F 21/577; G06F 2221/033
  See application file for complete search history.

(56) References Cited

U.S. PATENT DOCUMENTS

| | | | | |
|---|---|---|---|---|
| 6,738,813 | B1* | 5/2004 | Reichman | 709/224 |
| 7,243,236 | B1* | 7/2007 | Sibert | 713/179 |
| 8,302,080 | B2 | 10/2012 | Wassermann et al. | |
| 8,949,990 | B1* | 2/2015 | Hsieh | G06F 21/577 726/22 |
| 2003/0159063 | A1 | 8/2003 | Apfelbaum et al. | |
| 2008/0270841 | A1* | 10/2008 | Quilter | 714/38 |
| 2009/0018811 | A1 | 1/2009 | Paradkar et al. | |
| 2009/0119777 | A1* | 5/2009 | Jeon | 726/25 |
| 2010/0169974 | A1 | 7/2010 | Calendino et al. | |
| 2013/0007885 | A1 | 1/2013 | Haviv et al. | |

(Continued)

FOREIGN PATENT DOCUMENTS

CN    102819710 A    12/2012
WO    2011073982 A1    6/2011

OTHER PUBLICATIONS

Anonymously; "System, Method and Apparatus for Dynamic Creation of Tests for Dynamic Application Security Testing"; An IP.com Prior Art Database Technical Disclosure; http://iip.com/IPCOM/000219447D; Jul. 2, 2012. 5 pgs.

Li et al., "Perturbation-based user-input-validation testing of web applications," The Journal of Systems and Software 83 (2010) 2263-2274, Online pub date: Jul. 20, 2010.

(Continued)

*Primary Examiner* — Don Zhao
(74) *Attorney, Agent, or Firm* — Anthony J. Canale (57) ABSTRACT

In one embodiment, a computer-implemented method for security testing of web applications with specialized payloads includes submitting a test to a web application, where the test includes a payload with a set of constraints. A response is received from the web application. One or more constraints are derived from the response. The set of constraints of the payload are updated with the derived one or more constraints. The payload is synthesized, by a computer processor, for the updated set of constraints. The test having the synthesized payload is iterated with the updated set of constraints.

19 Claims, 4 Drawing Sheets

(56) References Cited

U.S. PATENT DOCUMENTS

| | | |
|---|---|---|
| 2013/0055397 A1 | 2/2013 | Amit et al. |
| 2013/0174262 A1 | 7/2013 | Amit et al. |
| 2014/0245159 A1* | 8/2014 | Levi et al. .................... 715/736 |

OTHER PUBLICATIONS

Search Report from GB Patent Office for Application No. GB1318119.3 dated Mar. 10, 2014, 4 pgs.

* cited by examiner

SECURITY TESTING OF WEB APPLICATIONS WITH SPECIALIZED PAYLOADS

FOREIGN PRIORITY

This application claims priority to Great Britain Patent Application No. 1318119.3, filed 14 Oct. 2013, and all the benefits accruing therefrom under 35 U.S.C. §119, the contents of which in its entirety are herein incorporated by reference.

BACKGROUND

Embodiments of this disclosure relate to the field of security testing of web applications or services and, more particularly, to security testing of web applications with specialized payloads.

Security testing is an important area of research and development. The rapid growth of mobile applications, web applications, and web services creates many opportunities for security attacks, thus emphasizing the need for quality testing of such applications.

One of the main challenges in security testing is to synthesize quality payloads, which are likely to demonstrate vulnerabilities in the target software system if such vulnerabilities indeed exist.

Current techniques rely on a generic pool of test payloads. These are not specific to the target application. Instead, a security expert defines all the payloads in advance, and the testing tool is then responsible for choosing which of the predefined payloads to send and in what order.

Advanced products have some limited adaptation capabilities, deciding which payloads from the pool to try when testing a given application. In these products, the choice of next payload is based on an analysis of why the last payload failed.

The testing tool has limited insight into the workings of server-side defenses. This has traditionally led commercial as well as research vulnerability scanners toward heuristic approaches, such as testing each input point, e.g., Hypertext Transfer Protocol (HTTP) parameter, with a short, predefined list of effective test payloads to balance between coverage and performance.

SUMMARY

In one embodiment, a computer-implemented method for security testing of web applications with specialized payloads includes submitting a test to a web application, where the test includes a payload with a set of constraints. A response is received from the web application. One or more constraints are derived from the response. The set of constraints of the payload are updated with the derived one or more constraints. The payload is synthesized, by a computer processor, for the updated set of constraints. The test having the synthesized payload is iterated with the updated set of constraints.

In another embodiment, a system includes a memory and one or more processors communicatively coupled to the memory. The one or more processors are configured to submit a test to a web application, where the test includes a payload with a set of constraints. The one or more processors are further configured to receive a response from the web application and to derive one or more constraints from the response. The one or more processors are further configured to update the set of constraints of the payload with the derived one or more constraints, and to synthesize the payload for the updated set of constraints. The one or more processors are further configured to iterate the test having the synthesized payload with the updated set of constraints.

In yet another embodiment, a computer program product for security testing of web applications with specialized payloads includes a computer readable storage medium having program instructions embodied therewith. The program instructions are executable by a processor to cause the processor to perform a method. The method includes submitting a test to a web application, where the test includes a payload with a set of constraints. Further according to the method, a response is received from the web application. One or more constraints are derived from the response. The set of constraints of the payload are updated with the derived one or more constraints. The payload is synthesized for the updated set of constraints. The test having the synthesized payload is iterated with the updated set of constraints.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the disclosure. However, it will be understood by those skilled in the art that the various embodiments of the disclosure may be practiced without these specific details. In other instances, well-known methods, procedures, and components have not been described in detail so as not to obscure the embodiments described.

Method and system are provided for dynamic security testing, whereby the testing tool does not require a list of candidate payloads in advance of testing. Instead, the payloads are generated on-the-fly during testing based on a synthesis algorithm that is guided by hints or constraints, derived from the ongoing testing session.

The payload is the information sent to a web application at a server for testing. Example payloads may include Extensible Markup Language (XML) information for web services, a uniform resource locator (URL) for PHP: Hypertext Preprocessor scripts, Representational State Transfer (REST) web services, etc. The payload may contain parts generated by the described method using specific grammar adapted for the technical context. The grammar of the payload describes the way the items or vocabulary are structured together.

Figure 1:
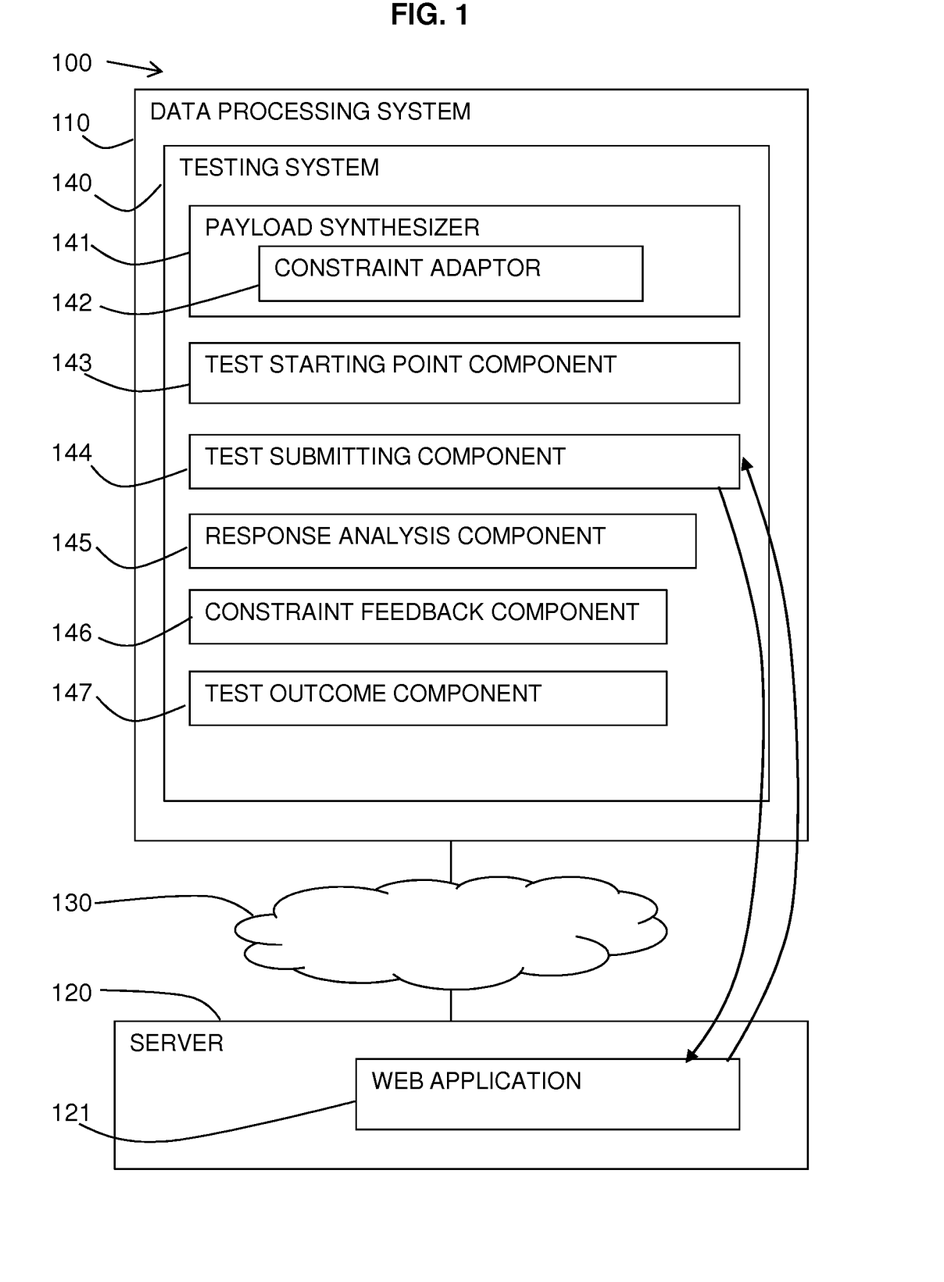
FIG. 1 is block diagram of a testing system environment, according to some embodiments of this disclosure.

Referring to FIG. 1, a testing system environment 100 is illustrated including a data processing system 110, which may be remotely connected to a server 120, which may host a web application 121. The data processing system 110 and server 120 may be in communication via a network 130.

The data processing system 110 may include a testing system 140 for testing the security of the web application 121. Web applications 121 are highly vulnerable to security attacks. The testing system 140 may aim to detect vulnerabilities in the web application 121.

The testing system 140 may include a payload synthesizer 141 for synthesizing a payload for testing based on constraints derived from the testing session. The payload synthesizer 141 may include a constraint adaptor 141 for updating constraints based on feedback from the testing.

The testing system 140 may include a test starting point component 144 for determining a starting probe or payload. A test submitting component 144 may submit the test to the web application 121 and receive the test response. A response analysis component 145 may analyze the response and determine the outcome of the test.

The testing system 140 may include a constraint feedback component 146 for updating the constraint adaptor 142 based on the response to the previous test. An outcome component 147 may be provided to report the outcome of the testing to a user.

Figure 2:
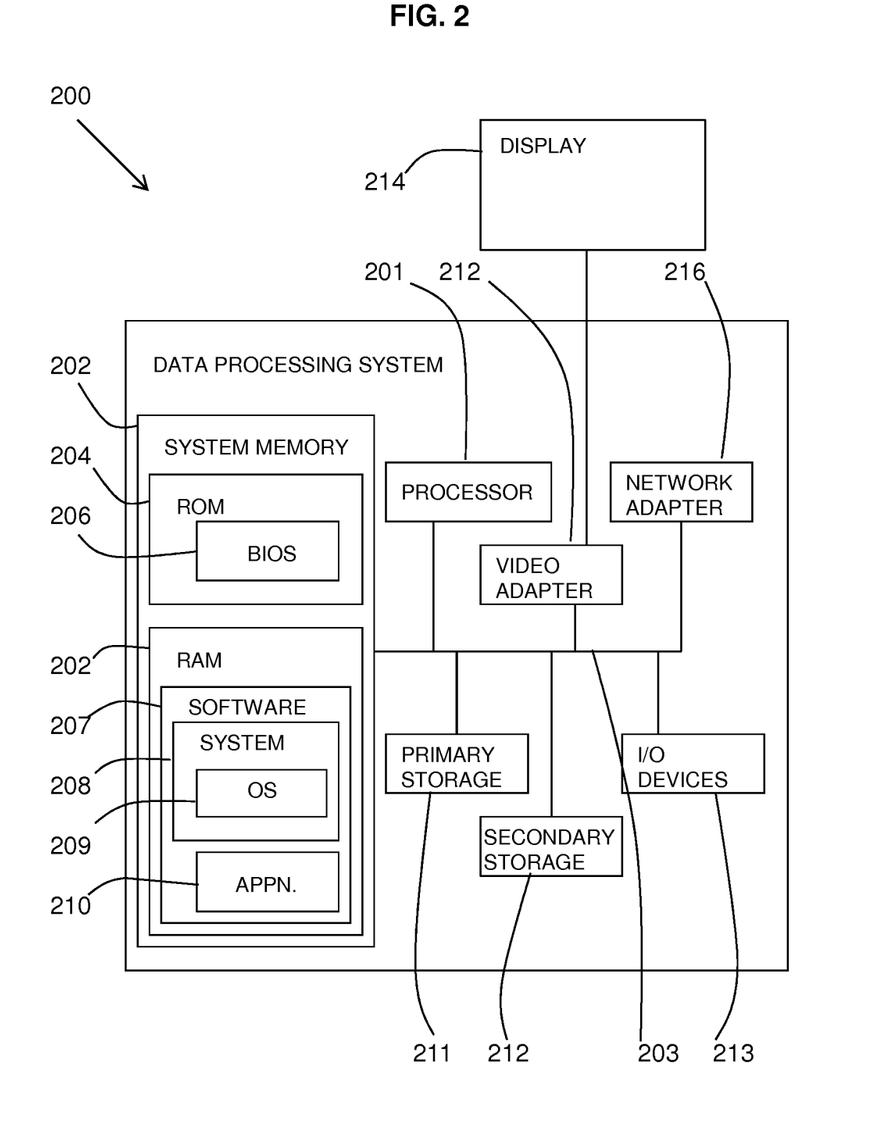
FIG. 2 is a block diagram of a computer system in which the testing system may be implemented, according to some embodiments of this disclosure.

Referring to FIG. 2, an exemplary system for implementing aspects of the invention includes a data processing system 200, suitable for storing or executing program code, including at least one processor 201 coupled directly or indirectly to memory elements through a bus system 203. The memory elements may include local memory employed during actual execution of the program code, bulk storage, and cache memories that provide temporary storage of at least some program code to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205, including operating system software 208. Software applications 210 may also be stored in RAM 205.

The system 200 may also include a primary storage means 211, such as a magnetic hard disk drive, and secondary storage means 212, such as a magnetic disc drive and an optical disc drive. The drives and their associated computer-readable media provide non-volatile storage of computer-executable instructions, data structures, program modules, and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 may be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215 which may include a GPU.

Figure 3:
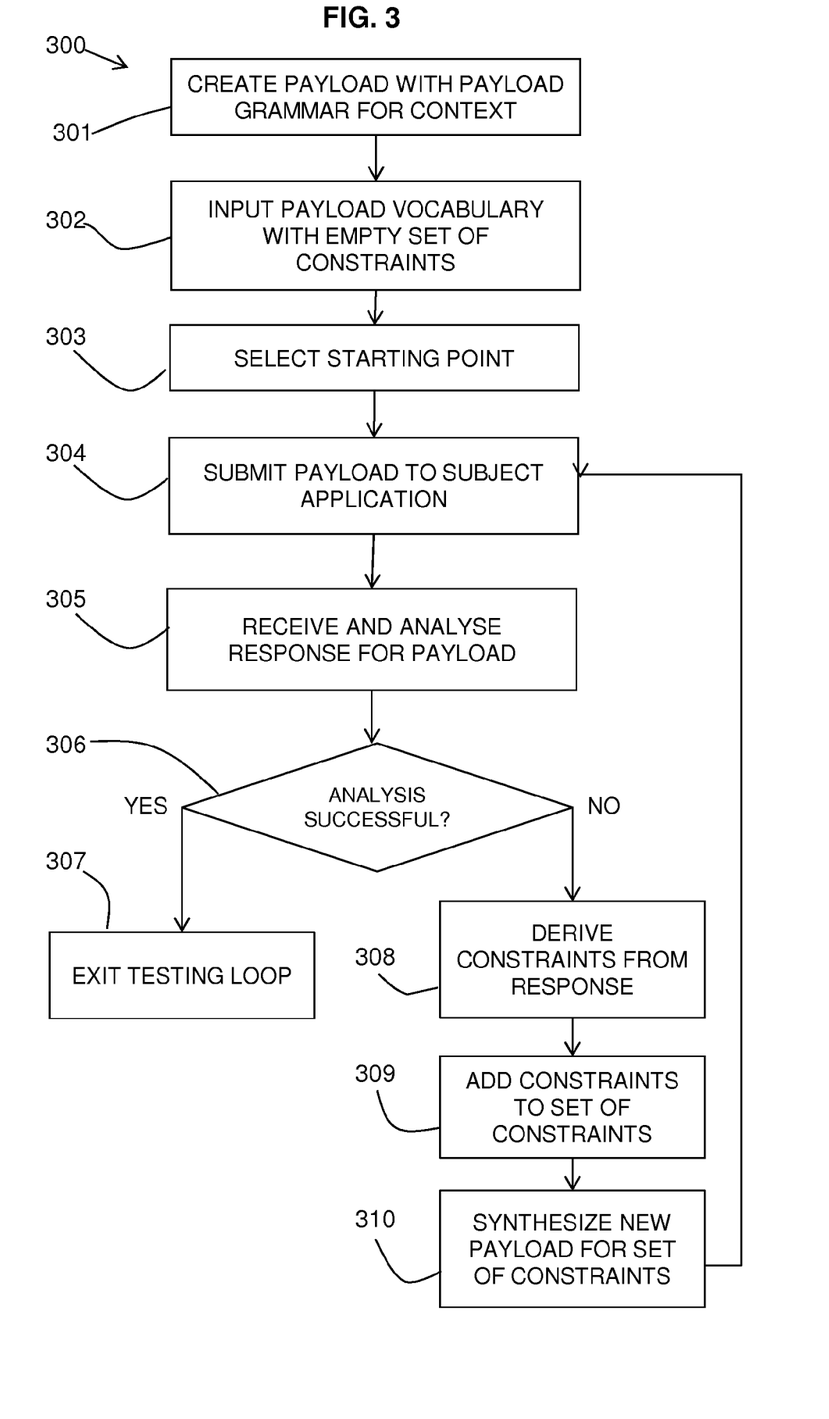
FIG. 3 is a flow diagram of a first example method, according to some embodiments of this disclosure.

Referring to FIG. 3, a flow diagram 300 shows an example embodiment of the described method.

At the beginning of the method, in a first iteration, there are no specific constraints to synthesize the first payload. Therefore a payload is created at block 301 based on existing grammar, using various techniques adapted for the technical context. In some embodiments, this first generation may be done randomly, using tokens from a vocabulary that respects the grammar. For example, token number X from the vocabulary may be selected and then other tokens are added as required using the rules defined by the grammar, so that the result is a payload that starts with token X and respects the grammar.

A payload vocabulary V is initially input at block 302, initialized with an empty or starting set of constraints C. A starting point may be selected, at block 303, which may be an arbitrary probe or payload.

The payload may then be submitted, at block 304, to the subject application. A response may be received and analyzed for the payload sent at block 305.

It may be determined at block 306 if the analysis is successful. If so, then the process may exit the testing loop at block 307.

If the analysis is not successful, constraints may be derived at block 308 from the test failure and these may be added at block 309 to the set of constraints C. A new payload over V may be synthesized, at block 310, where the payload is compatible with the updated set of constraints C.

The method may loop and the new payload may be submitted at block 304 to the subject application.

Figure 4:
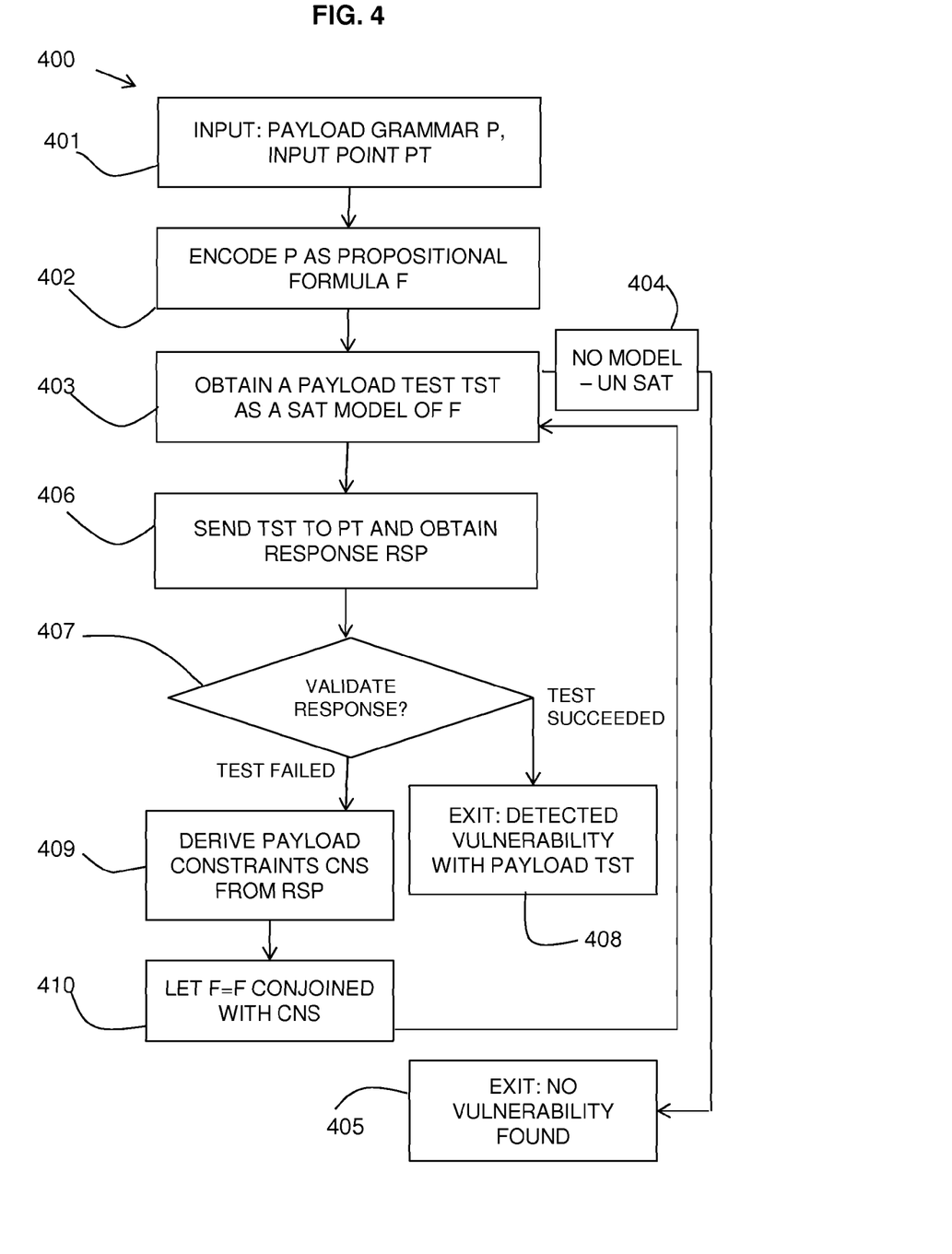
FIG. 4 is a flow diagram of a second example method, according to some embodiments of this disclosure.

Referring to FIG. 4, a flow diagram 400 shows a further example embodiment of the described method.

An input is made at block 401 of payload grammar P and an input point PT. The payload grammar P is encoded at block 402 as propositional formula F. A payload test (TST) is obtained at block 403 as a SAT model of F. A SAT model is a satisfying or unsatisfying solution, which takes the set of constraints dynamically generated and applies them to the grammar to determine if it is possible to generate a new payload that respects the grammar and also respects the existing constraints.

If there is no possible model at block 404, it is UN SAT, which means that there are no more solutions for this problem, and the process exits at block 405 as no vulnerability is found.

For example, in some embodiments, if previous tests have proven that some tokens are well handled by the application (i.e., tokens X, Y, and Z), then as a result the constraints, "payload should not contain token X," "payload should not contain token Y," etc. may be added, and the SAT solver may attempt to generate the new payload based on these constraints. If this is not possible, the result is UN SAT and there are no more solutions, and therefore, no vulnerability is found.

The payload test is sent at block 406 to the input point PT, and a response (RSP) is obtained.

It may be determined at block 407 if the response is valid. For example, this may be determined by testing that the answers from the server do not contain the previously injected tokens. If the test succeeded, for example, in the case that the server side allows the return to the end user some injected tokens, then the process exits at block 408 with a detected vulnerability with the payload test.

If the test failed, payload constraints (CNS) may be derived at block 409 from the response. A new propositional formula F is proposed at block 410, equal to the previous F conjoined with the constraints. The new propositional formula F is input into step 403 to obtain a payload test as a SAT model of the new F and the method iterates.

To cast this algorithm into a concrete example setting, consider security testing of web applications, for example, for cross-site scripting (XSS) vulnerabilities. XSS is ranked as one of the top web vulnerabilities. XSS enables attackers to inject client-side scripts into web pages viewed by other users. An XSS vulnerability permits an attacker to bypass access controls, such as the same-origin policy, which can lead to significant security risks. Such risks commonly include transmitting private data (like cookies) to the attacker, or redirecting the victim to web content controlled by the attacker.

In this example embodiment, the vocabulary for synthesis of new payloads consists of XSS tokens, such as script, alert, JavaScript®, etc. Constraints learned during testing may be about the tokens within the payload that undergo sanitization (for example, if the response replaces script by an empty string).

In some embodiments, synthesis of new payloads can be achieved with a standard satisfiability solver, where the learned sanitization-related constraints, and structural constraints over payloads, are encoded in propositional form.

More specifically, consider the common case of a PHP: Hypertext Preprocessor (PHP) page and cross-site scripting vulnerabilities. By design, such attacks consist of attempts to inject code (i.e., user-provided scripts) to the remote server using vulnerabilities (e.g., permeability to such injection due to a lack of sanitizer).

Vulnerabilities that may also be detected arise when the server side allows the return to the end user of some tokens that belong to the XSS grammar, whereas the server side could have sanitized all the tokens.

The context for XSS vulnerabilities is to check that there are no capabilities for an external source to craft the server answer with code that would be executed on the client side. This kind of code injection could change the behavior of the HTML page. For example, such a code injection may introduce redirection to incorrect URLSs, change behavior of specific buttons, alter display of information, etc. To avoid this, the server side could sanitize all the inputs in order to deleted all the possible code injection attempts.

An example implementation is described of a PHP script that will ask for parameters and will return the result of the input in terms of a form that compiles the previous parameters.

That is, the structure on the client side of the call (i.e., the payload) executed against the server may be:

input.php?name=the input name etc. . . .

The result of this page will be an HTML answer, for example:

```
<!DOCTYPE html><html><body>...
<input type="text" value=" the input name "/>
...</body></html>
```

Following, this description will only focus on the <input/> answer element.

For this example, it is assumed also that the server-side code is protected by a sanitizer intended to prevent this code injection. The structure of this sanitizer may be:

```
<?php
$pattern = "/((.*)on[A-Za-z]+=(.*)|(.*)script(.*)|(.*)img(.*))/i";
$param = $_REQUEST['param'];
while (preg_match($pattern, $param, $matches)) {
$param = "";
for ($i=2; $i<count($matches); $i++) {
$param .= $matches[$i]; } }
?>
```

An aim of the described method within this XSS technical context will be to double check that the sanitizer in place on the server side does not offer permeability to a cross-site scripting attack. The described method, adapted to the XSS context may thus: define an XSS payload grammar (with test payloads); start with a default payload; validate whether the result is correct (or not) according to the existence of the attack into the server answer; update as required the SAT encoding so that a new payload is created; and then loop over the previous statements.

To define the grammar for this context, the grammar used to synthesize the payloads nay be:

```
jsPayload -->      [window [location]=jsLocation]
                   | eval('ale'+'rt'+'('probe')') | probe+{jsFnc:alert}
                   | eval('ale'+'rt'+'('probe')') j alert(probe)
                   | eval("ale"+"rt"+"("probe")")
jsFnc -->          toString | valueOf
probe -->          PROBE
location -->       'location' | "location" | 'location'
jsLocation --> ...
```

In a first iteration, begin with the SAT formula true, which lets whichever payload is wanted to be sent. Send some arbitrary payload, for example:

"onmouseover=alert("XSS1")/>

This payload, processed by the sanitizer, fails with the result:

<input type="text" value=" " alert("XSS1")/>"/>

The above may be represented as a constraint over the grammar, stating that the payload may not contain the token onmouseover.

In a second iteration, search for a payload that models the updated SAT formula. One such payload may be:

"/><script>alert("XSS2")</script>

This payload also fails with the result:

<input type="text" value=" " /><  >alert("XSS2")< >" />

Thus, update the SAT formula to contain the additional constraint that the token script is not contained in the payload.

In a third iteration, search for a production of the grammar that models the updated SAT formula (containing two constraints), which leads to payload:

"style="width: expression(alert('XSS5'))

This payload shows the sanitizer in question to be vulnerable, having associated response:

<input type="text" value=" " style="width: expression (alert('XSS5'))" />

In the specific embodiment referred to in the example, the learned constraints are over the tokens having a payload (i.e., grammar tokens in the grammar representation). Other options exist, including more advanced types of constraints. As an example, regular constraints (i.e., ones that can be expressed as a regular language) over the entire payload may be used. This is useful in cases where the server-side defenses are implemented as a regex match. The described method and system need not commit to any particular style of constraints, but give only examples of possible constraint representations.

As for the actual encoding, following, the propositional variables that are being introduced are explained. For the simple example of token-based constraints, assume that there are n tokens, $t\_1 \ldots t\_n$, such that each payload is a sequence over this set of tokens. Starting with the basic SAT setting, which abstracts away the payload's being a sequence and treats it as a set of tokens, each propositional variable corresponds to a single token. Thus, $v\_1 \Leftrightarrow t1, \ldots, v\_n \Leftrightarrow t\_n$. The formula is essentially the conjunction of token-based constraints, e.g., $!v\_1 * !v\_3 * !v\_5$, which means that the payload need not contain tokens $v\_1$, $v\_3$ and $v\_5$.

A more sophisticated encoding may also account for the fact that the payload is a sequence, and thus may define a unique propositional variable per each token-offset pair, where for instance $v\_\{3,1\}$ means token $v\_3$ at offset 1 within the payload. This is useful if server-side defenses are likely to block a token at a certain position, but not in other positions. There are known real-world sanitization examples of this nature.

An additional point is about encoding the grammar itself. Following, it is explained how this is done by means of an example. Assume for simplicity that the grammar contains only three tokens, $t\_1$, $t\_2$, $t\_3$, and two productions, $[t1,t2]$ and $[t\_1,t3]$. Then generate the following initial formula: $(v\_1 * v\_2) + (v\_1 * v\_3)$. Now turn to the SAT solver for the first payload, and get back $v\_1=1$, $v\_2=1$, which corresponds to payload $[t\_1,t2]$. Assume now that the constraint $!t\_2$ is learned. Then the updated formula is: $((v\_1 * v\_2) + (v\_1 * v\_3)) * !v\_2$. Turn to the SAT solver again, and this time it directs to $[t\_1,t\_3]$.

It would be understood that this form of encoding may put the grammar productions, rather than the grammar itself, into the form of a propositional formula. For a standard grammar of security payloads, it may also be possible to encode the grammar directly into a propositional formula by distinguishing, via propositional variables, different occurrences of non-terminal tokens. While both options are viable, the former option may be simpler than the latter alternative of encoding the grammar directly.

An advantage of the described method is that the synthesized payloads may be specialized, per the behavior of the application under consideration.

The developers of the testing algorithm are relieved of the burden of building, and later maintaining and updating, a comprehensive database of payloads in support of the tool, which is a tedious and non-trivial task that requires high expertise.

Users of the algorithm do not need to worry about updates and maintenance issues. Also, the threat of poor coverage by the algorithm because the payloads are not up-to-date may be lifted.

According to an embodiment of this disclosure, there is provided a method for security testing of web applications with specialized payloads. The method may include submitting a test to a web application, where the test includes a payload with a set of constraints. One or more constraints are derived from a received response to the test. The set of constraints may be updated with the derived constraints. The payload may then be synthesized for the updated set of constraints. The test having the synthesized payload may be iterated with the updated set of constraints.

The method may further include creating a payload including defined grammar describing the way items in the payload are structured together. In one embodiment, before a first iteration of the test, a payload may be generated using random items that respect the grammar. The test may have a first payload with an empty set of constraints.

The method may further include selecting a starting point for the test in the web application.

The method may further include applying the set of constraints to the grammar to determine whether it is possible to generate a new payload that respects the grammar and respects the existing constraints. The application may use a satisfying or unsatisfying solution solver.

In one embodiment, the payload grammar may be encoded as a propositional formula. The one or more constraints may be token-based constraints. Alternatively, the one or more constraints may be regular language constraints over the entire payload.

In one example embodiment, the test may be a test for cross-site scripting, and the payload may include constraints in the form of tokens which should be sanitized by a server hosting the web application under test.

The payload may be a sequence and may define a unique propositional variable for each token-offset pair.

The payload may further include encoding grammar into a propositional formula by distinguishing different occurrences of non-terminal tokens.

Another embodiment may be a system for performing a method having the above features, or a computer program product executable by a computer processor to implement such a method.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A computer-implemented method for security testing of web applications with specialized payloads, the method comprising:
submitting to a web application a payload based on a set of constraints of the payload, the set of constraints of the payload being in form of tokens sanitizable by a server hosting the web application, the submitting being at least a portion of a vulnerability test for the web application, and the vulnerability test being a test for cross-site scripting;
receiving a response from the web application;
deriving one or more constraints from the response;

updating, by a computer processor, the set of constraints of the payload with the derived one or more constraints to generate an updated set of constraints;

synthesizing, by the computer processor, an updated payload based on the updated set of constraints, the updated payload being submittable as input to the web application for testing the web application;

iterating the vulnerability test one or more times by submitting to the web application the updated payload based on the updated set of constraints; and determining, in response to the vulnerability test, that no vulnerability is identifiable in the web application, responsive to a failure to synthesize a new updated payload during the iterating.

2. The method of claim 1, wherein the vulnerability test further comprises a first payload based on an empty set of constraints.

3. The method of claim 1, further comprising:
creating the payload including a defined grammar describing how items in the payload are structured together.

4. The method of claim 3, further comprising, before a first iteration of the vulnerability test, generating the payload using random items that respect the defined grammar.

5. The method of claim 3, wherein the defined grammar of the payload is encoded as a propositional formula.

6. The method of claim 3, further comprising determining the failure to synthesize the new updated payload, wherein the determining the failure comprises:
applying a current set of constraints to the defined grammar; and
determining that it is impossible to generate a new payload that respects the defined grammar and respects the current set of constraints.

7. The method of claim 6, wherein the applying the current set of constraints to the defined grammar comprises using a satisfying or unsatisfying solution solver.

8. The method of claim 3, wherein the payload comprises the defined grammar encoded into a propositional formula by distinguishing occurrences of non-terminal tokens.

9. The method of claim 1, further comprising selecting a starting point for the vulnerability test in the web application.

10. The method of claim 1, wherein the set of constraints of the payload are token-based constraints.

11. The method of claim 1, wherein the set of constraints of the payload are regular language constraints over the payload.

12. The method of claim 1, wherein the payload is a sequence and defines a unique propositional variable for each token-offset pair.

13. A system for security testing of web applications with specialized payloads, comprising:
a memory; and
one or more processors, communicatively coupled to the memory, the one or more processors configured to:
submit to a web application a payload based on a set of constraints, the set of constraints of the payload being in form of tokens sanitizable by a server hosting the web application, the submitting being at least a portion of a vulnerability test for the web application, and the vulnerability test being a test for cross-site scripting;
receive a response from the web application;
derive one or more constraints from the response;
update the set of constraints of the payload with the derived one or more constraints to generate an updated set of constraints;
synthesize an updated payload based on the updated set of constraints, the updated payload being submittable as input to the web application for testing the web application;
iterate the vulnerability test one or more times by submitting to the web application the updated payload based on the updated set of constraints; and
determine, in response to the vulnerability test, that no vulnerability is identifiable in the web application, responsive to a failure to synthesize a new updated payload during the iterating.

14. The system of claim 13, the one or more processors being further configured to select a starting point for the vulnerability test in the web application.

15. The system of claim 13, the one or more processors being further configured to create the payload according to a defined grammar describing how items in the payload are structured together.

16. The system of claim 15, the one or more processors being further configured, before a first iteration of the vulnerability test, to generate the payload using random items that respect the defined grammar.

17. The system of claim 15, the one or more processors being further configured to determine the failure to synthesize the new updated payload, wherein to determine the failure, the one or more processors are further configured to:
apply a current set of constraints to the defined grammar; and
determining that it is impossible to generate a new payload that respects the defined grammar and respects the current set of constraints.

18. The system of claim 17, the one or more processors being configured to apply the current set of constraints to the defined grammar by using a satisfying or unsatisfying solution solver.

19. A computer program product for security testing of web applications with specialized payloads, the computer program product comprising a non-transitory computer readable storage medium having program instructions embodied therewith, the program instructions executable by a processor to cause the processor to perform a method comprising:
submitting to a web application a payload based on a set of constraints of the payload, the set of constraints of the payload being in form of tokens sanitizable by a server hosting the web application, the submitting being at least a portion of a vulnerability test for the web application, and the vulnerability test being a test for cross-site scripting;
receiving a response from the web application;
deriving one or more constraints from the response;
updating the set of constraints of the payload with the derived one or more constraints to generate an updated set of constraints;
synthesizing an updated payload based on the updated set of constraints, the updated payload being submittable as input to the web application for testing the web application;
iterating the vulnerability test one or more times by submitting to the web application the updated payload based on the updated set of constraints; and
determining, in response to the vulnerability test, that no vulnerability is identifiable in the web application, responsive to a failure to synthesize a new updated payload during the iterating.

* * * * *